Dec. 25, 1956     J. E. BEVINS ET AL     2,775,442
SPEED REGULATING MEANS

Original Filed April 16, 1945     5 Sheets-Sheet 1

Inventors
James E. Bevins
Robert W. Hyde

By
ATTORNEY

Dec. 25, 1956   J. E. BEVINS ET AL   2,775,442
SPEED REGULATING MEANS
Original Filed April 16, 1945   5 Sheets-Sheet 3

Inventors
James E. Bevins
Robert W. Hyde
By
ATTORNEY

Dec. 25, 1956   J. E. BEVINS ET AL   2,775,442
SPEED REGULATING MEANS
Original Filed April 16, 1945   5 Sheets-Sheet 4

Inventors
James E. Bevins
Robert W. Hyde

By [signature]
ATTORNEY

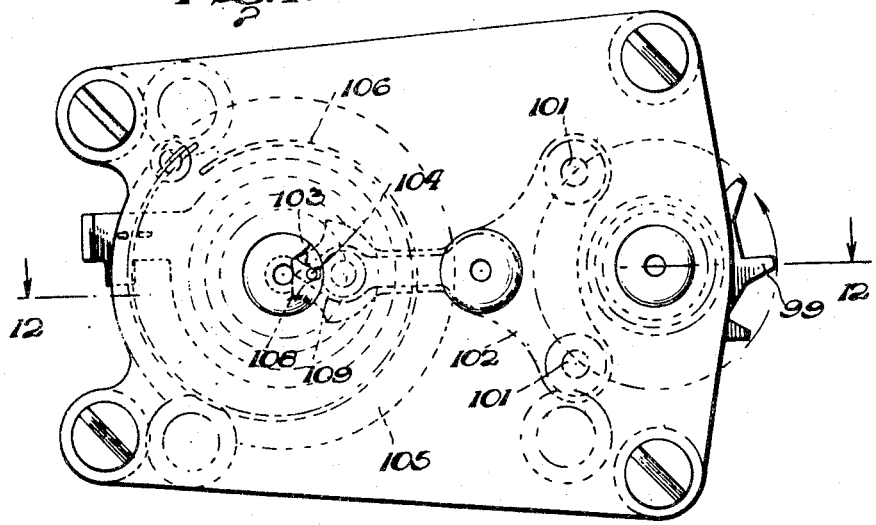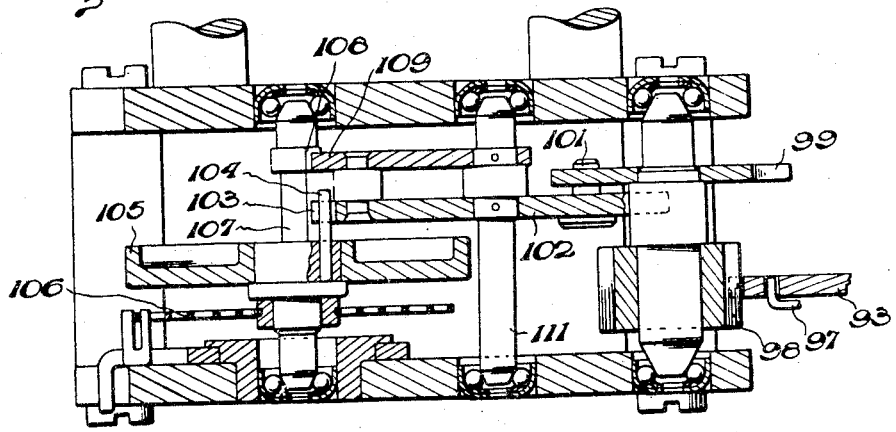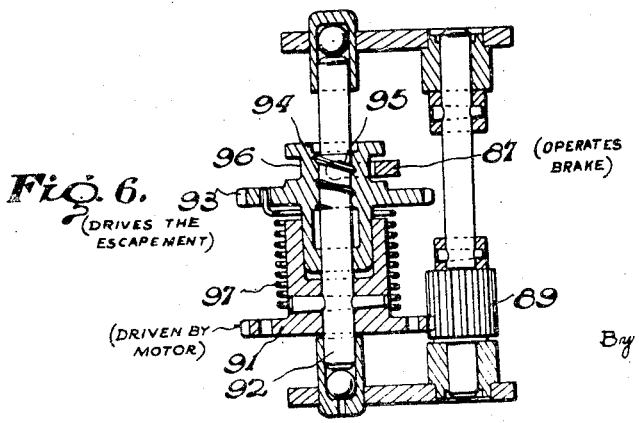

2,775,442

SPEED REGULATING MEANS

James E. Bevins, Ramsey, and Robert W. Hyde, Englewood, N. J., assignors to Bendix Aviation Corporation, Teterboro, N. J., a corporation of Delaware Application March 13, 1950, Serial No. 149,927, which is a division of application Serial No. 588,600, April 16, 1945. Divided and this application October 27, 1951, Serial No. 254,137

1 Claim. (Cl. 264—10)

This invention relates generally to recording and/or indicating instruments and more particularly to a novel combined instrument adapted for permanently recording with respect to time and for simultaneously indicating the instantaneous values of various functions or conditions encountered during craft flight such as, for example, airspeed, pressure, humidity, temperature, etc. This application is a division of application Serial No. 149,927, filed March 13, 1950, which is itself a division of application Serial No. 588,600, filed April 16, 1945, now U. S. Patent No. 2,551,866, issued May 8, 1951.

An object of the present invention is to provide an instrument of the foregoing character in which each of the functions being considered is measured at a distant point by an electrical transmitter which is connected to a related electrical repeater at the instrument, the repeater actuating a marker pin relative to a recording chart as well as an index relative to a related graduated scale in correspondence with the value of the conditions being measured.

Another object of the invention is to provide a multi-type recorder having a plurality of repeater devices thereat electrically connected to related remote transmitters, a novel arrangement being provided for initially centering the movable portions of the repeaters and for thereafter connecting the transmitters with their related repeaters whereby the repeaters reproduce the motion of the transmitters.

A further object is to provide a high speed and light weight recorder of a plurality of variable functions such as, for example, airspeed, pressure, humidity and temperature.

Another object is to provide a multi-type recorder having a multi-color ribbon with automatic driving and reversing means therefor together with novel means for shifting the ribbon transversely of the markers for utilizing all of the ribbon.

A further object is to provide a novel constant speed driving mechanism for a record chart together with a novel chart re-roll provision for the used portion of the chart.

Still another object is to provide novel means for converting angular motion of a self-synchronous repeater into linear motion of a marking and/or indicating index with a minimum of friction and without the use of amplifiers or servo systems.

A further object is to provide a novel combined indicator and recorder of the values of a number of variables having continuously readable indications relative to graduated scales and with the recorded values for a preselected period of time visible on the chart from the exterior of the instrument, a cover having a window therein being provided for the instrument, the window being arranged over the chart and scales.

Another object is to provide a novel recorder adapted for rapid and accurate operation at temperatures from as low as —50° C. to as high as 70° C.

A still further object is to provide a novel multi-function recorder having novel readily detachable and interchangeable sub-assemblies of groups of like or functionally associated elements.

Another object is to provide a recorder having novel marginal printing means whereby paper shrinkage may be readily evaluated together with novel chart roll driving means adapted for extension to accommodate paper expansion.

The above and other objects and advantages of the invention will appear more fully hereinafter from a consideration of the detailed description which follows taken together with the accompanying drawings. It is to be expressly understood, however, that the drawings are for the purpose of illustration and description only and are not designed as a definition of the limits of the invention.

In the drawings wherein like reference characters refer to like parts throughout the several views:

Figure 1 is a perspective view, generally from the front, of the instrument with the cover on;

Figure 4:
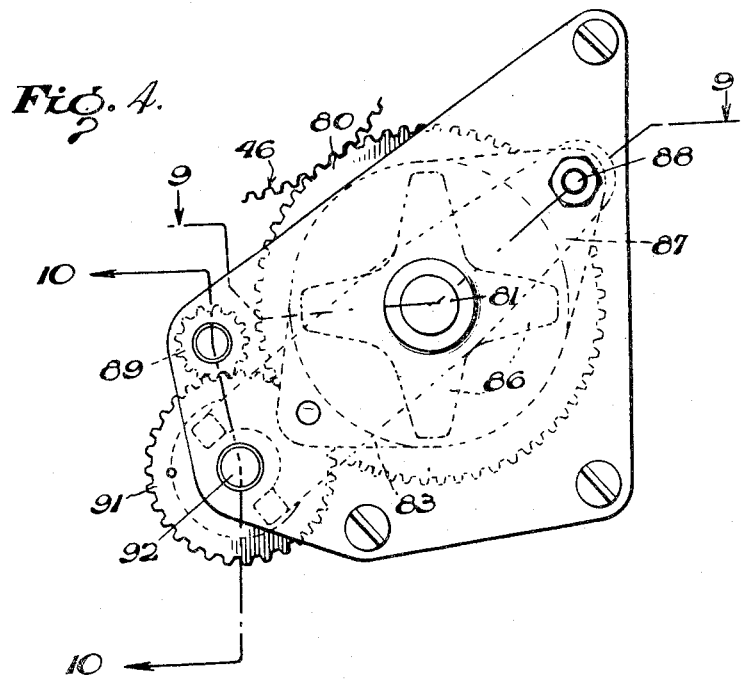
Figure 4 is a somewhat diagrammatic view of the speed control for the motor drive taken, generally looking toward the lefthand end of the instrument.
Figure 5:
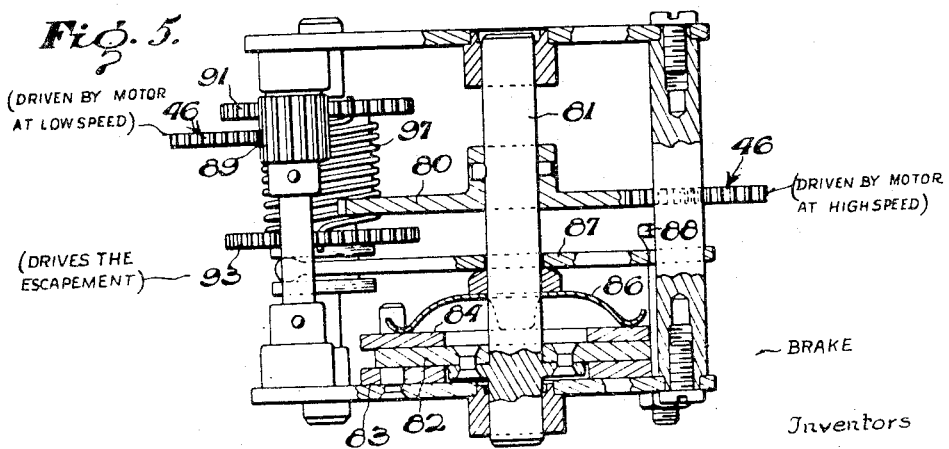
Figure 5 is a sectional mechanism diagram of the control of Figure 4, taken along lines 9—9.

Figure 6 is a sectional view of the screw-differential mechanism which actuates the control of Figures 4 and 5, being taken along line 10—10 of Figure 4; and Figures 7 and 8 are respectively an end elevation and section of the escapement mechanism, Figure 8 being taken along line 12—12 in Figure 7.

The device disclosed, by way of example, continuously indicates the values of four variables, including the velocity of a craft carrying the instrument, by the position of indices moved longitudinally along their respective scales. It also records each of these values in a different color on a standard strip chart which is ten inches wide on the graduated portion and which moves at twelve inches per hour. It also records a standard width by marginal marks so as to indicate any errors due to changes in width of the chart, such as are due to variations of relative humidity and temperature of the air within the instrument casing.

The recorder is also effective to provide reference marks in the middle of the chart so that the times of any noteworthy values of the recorded variables may be later identified, e. g., the time of starting a trip or of using a radio in the craft. The operator merely presses a reference marker button to cause the mark to be made. This button may be either at the recorder or at a distance since it actuates a switch which controls a solenoid which in turn moves the marker, against a spring, into operative position. This switch may also be operated automatically.

While the recording is intermittent, it is preferably at such a high rate, once per second, e. g., that the records of each value normally appear as continuous lines.

The instrument is supplied with 26 volt, 400 cycle power. It contains two lights for the chart and the four indicating scales, a manually operated light switch being furnished for turning the lights on and off. A section of the chart is always visible which shows the operator at all times what has happened in the preceding fifteen minutes.

Two electrical motors are operated from the power supply when a motor switch is turned on. One motor merely turns an eccentric weight to cause a slight vibration which substantially eliminates errors of the measurements due to mechanical or coulomb friction. The other motor drives the chart and a platen for tapping the chart and a four-color ribbon against four recording pins. Since the frequency of the power supply on a craft is occasionally not of sufficient accuracy for timing the chart, the chart-operating motor used is of the induction type which can slip considerably without stalling and is provided with a brake to regulate its speed, the vibrator-motor being of the same sort.

A novel feature of the present invention is an arrangement in which the brake is actuated by the difference between a speed that is proportional to the operating motor speed and that of an escapement which is driven by a spring which is wound by the motor, a screw-differential mechanism being used for this purpose. This compact light-weight regulated motor solves the problem of operating the recorder at a substantially constant speed as is required for subsequent interpretation of the records.

The chart-operating mechanism is geared to the speed-regulated motor so that the timing roll turns the chart at the desired speed of twelve inches per hour. The chart passes into guides which cause it to be re-rolled, two re-roll rollers being turned at a peripheral speed of approximately twenty-four inches per hour to ensure a tight roll which is convenient for filing. A tear-off strip with serrated teeth is provided. This chart-handling arrangement is very light and eliminates the usual detachable heavy re-roll roller that occasionally is lost or mislaid when needed.

The ribbon is also driven by the regulated motor which turns two driving gears, one of which is engaged at a time with its respective spool, a splined connection being used for the shaft that carries the two driving gears. The drive is shifted from one spool to the other by a four-pronged cam which actuates a reversing lever that moves the driving-gear shaft endwise on a reversal. This cam is also driven by the regulated motor so that a reversal occurs every one and one-half hours. Friction clutches are provided between the driven gears and the spools so that the ribbon can neither be damaged nor stall the recorder in case the ribbon is not reversed when it first reaches the end of its travel from one spool to the other.

To ensure the use of the entire surface of the ribbon, a two-lobed cam is provided to slowly oscillate the ribbon vertically. This cam is attached to a 40-tooth ratchet which is pawl-actuated by the reversing lever on each complete reversing cycle, a complete vertical oscillation of the ribbon occurring every thirty hours.

The printing platen is actuated by a two-lobed cam driven by the regulated motor. The platen is spring-biased toward the paper but pushed away once a second by a lever which is operated by the cam. When the end of the lever drops off the end of a lobe of the cam, the platen taps the chart and ribbon against the several recording pins, marginal markers and the reference marker when the latter is in its marking position.

A platen lock-out detent lever is located by the cam-operated lever to hold the platen well clear of the ribbon so that the chart can be readily inserted and also for cold-starting, at which time the chart-drive gearing may be turned by hand until its motor can carry the load. Adjusting screws for the platen stroke govern the strength of the recorded lines on the chart.

Each synchro receiver operates through an angle of 330°, or 165° each side of its electrical zero. Each receiver has its respective pulley of slightly less than 4 inches diameter. A thin multi-filament cellulose acetate cord is connected with the pulley and its indicating and marking pin. The cord passes from a groove in the drive pulley to the marking pin and then around an idler pulley at the opposite end of its scale, the cord returning to another idler pulley at the drive pulley end of the scale, and finally to another groove in the drive pulley, the cord being on the opposite side from that in the first-named groove and secured under negligibly slight tension to the drive pulley.

This arrangement enables the rotary movement of the receiver to be translated into longitudinal movement of the indicating and marking pin along its scale with a minimum of friction and with free operation over a very wide range of temperature. The vibrator-motor cooperates in obtaining this result by substantially eliminiating errors due to mechanical friction. The platen is normally away from the paper and ribbon so that light springs on the back of the scales normally force the ribbon away from the pins, thus leaving the pins free to assume their correct positions.

A border marker is attached to one of the scales at each end to indicate true range limits on the chart so that effects of changes in width of the paper chart due to changes of relative humidity and temperature can be eliminated. In the middle of the chart is a reference marker wihch is actuated against a spring by a solenoid to come into marking position when the solenoid is energized. The reference marker records the times of noteworthy events such as the start of a trip or flight or the entry into a cloud.

The electrical system for operating the instrument when a motor switch is turned on includes a transformer producing the necessary voltages, 15, 40 and 100 volts from the 26 v., 400 cycle supply. As soon as the motor switch is turned on, the vibrator motor and the regulated motor both start instantly. The rotor coils of each of the four synchro receivers are energized and two of their three field coils shorted so that each synchro receiver is immediately brought to its electrical zero position.

After a 15-second warm-up delay, a duo-diode tube energizes the relay coil to operate the relay to connect each of the synchro receivers to its respective transmitter with the result that the receiver then moves its index and pin to a position corresponding with the value being transmitted.

This centering and delay feature is necessary to eliminate a tendency which otherwise exists for the synchro receiver to go to its end position when the starting position of the receiver happens to be near one end of the scale and its transmitter happens to be at the other when the telemetering circuit is first closed. Without this delay feature, it would be necessary to limit the total travel of the synchros to less than 180° which would result in a considerable loss of accuracy.

Each of the functionally related groups of elements is separately mounted as a readily detachable interchangeable sub-assembly to facilitate calibration or inspection and maintenance.

From the foregoing resume, it is manifest that a simple, lightweight, accurate, multipoint, indicator-recorder has been provided, by means of which the aforementioned objects have been attained.

Figure 1:
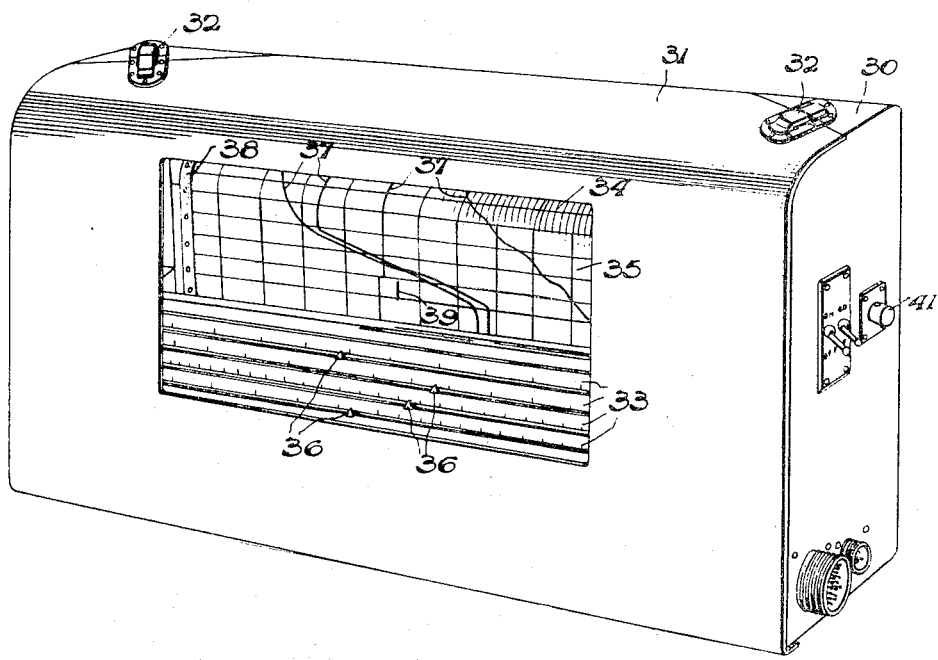

Referring now to the drawings for a more detailed description and more particularly to Figure 1 thereof, the present invention is shown as comprising an instrument casing 30 provided with a cover 31 which in its assembled condition hooks on at the bottom of the casing and is secured to the top thereof by way of suitable latches 32. Cover 31, on the other hand, is provided with a window 34 which exposes to view scales 33 arranged near the bottom of the window as well as a section of a strip chart 35 containing recorded values of the functions being measured for a predetermined time interval.

Each of the scales 33 is provided with an index 36 for indicating the instantaneous measured value of each variable, the values being respectively recorded as represented by the lines 37 on the chart. Marginal lines 38 (only one being visible in Figure 1) are recorded continuously to provide a reference independent of temperature or humidity effects on the chart sheet while a reference mark 39, centrally shown on the chart, is recorded when the operator presses reference marker button 41. A suitable mounting bracket (not shown) is connected with the casing 30 by resilient shock mounts by means of which the instrument may be detachably secured to the craft.

Figure 2:
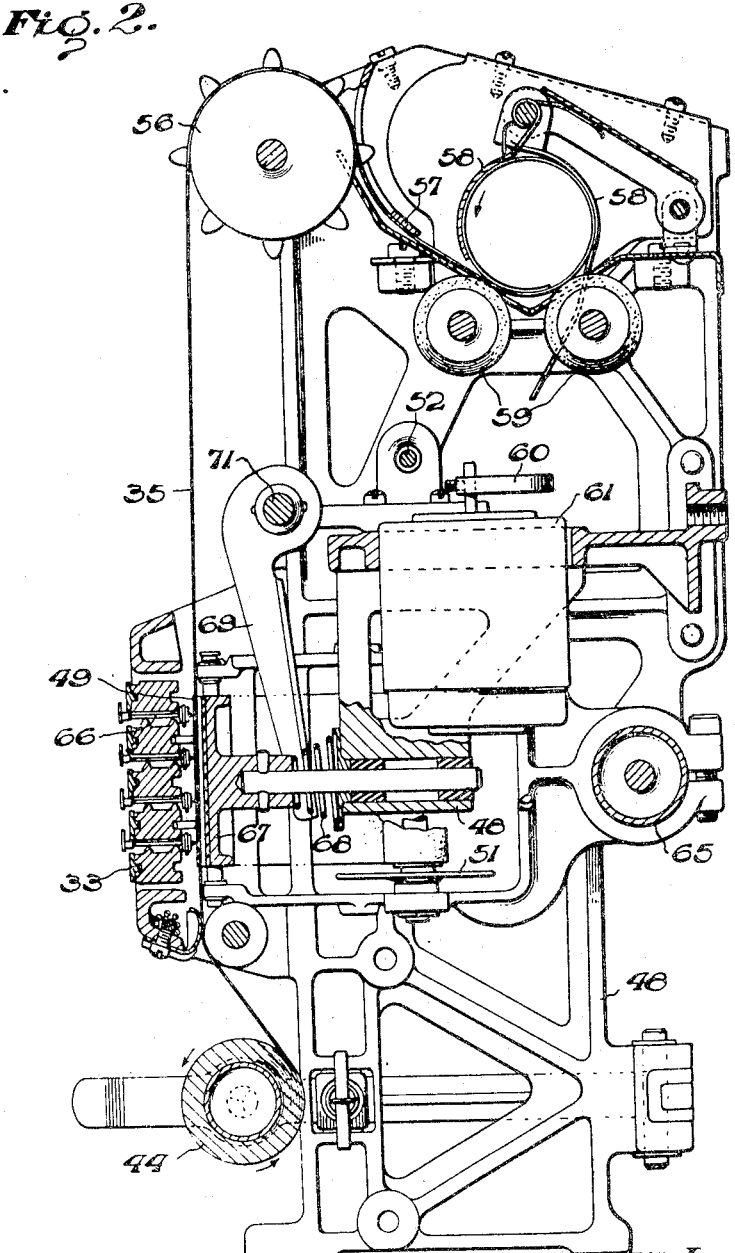
Figure 2 is a sectional elevation of the instrument, showing the chart handling mechanism.
Figure 3:
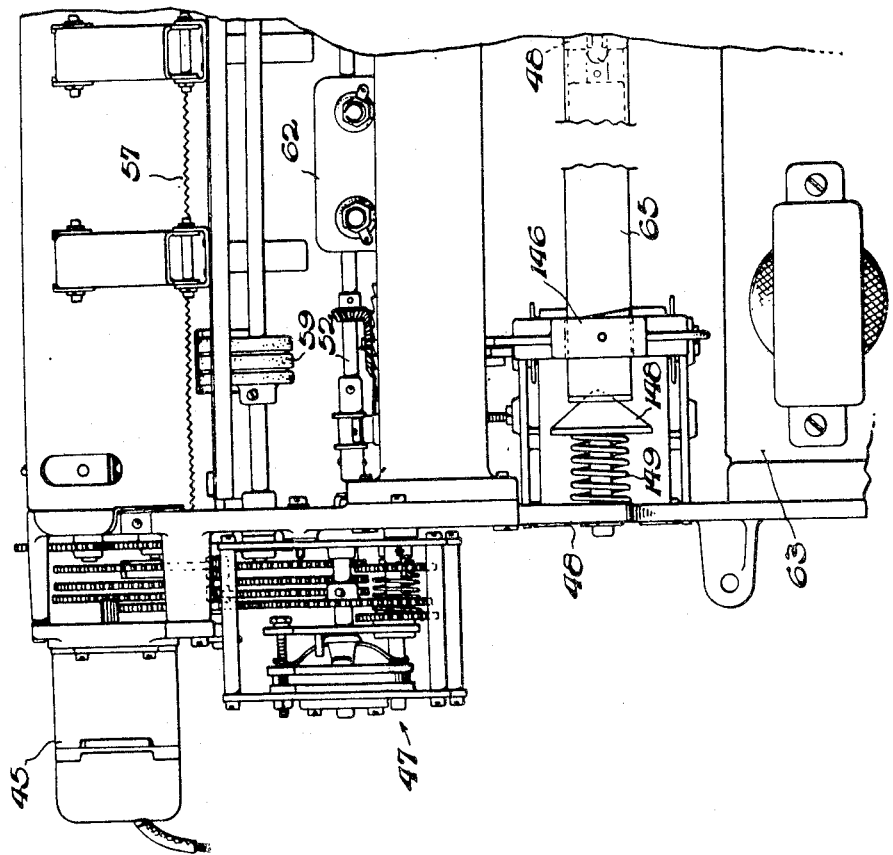
Figure 3 is a partial rear elevation showing the location of the re-roll device.

The major components of the novel features of the present invention are shown in Figure 2-8, inclusive, wherein the cover and casing of the instrument of Figure 1 have been removed. For example, the chart feed roll 44 (Figure 2) is arranged at the front of the instrument, below indicating scales 33. A driving motor 45 is arranged, as shown in Figure 3 at the upper portion of the instrument and is connected by way of suitable gearing 46 with the escapement-differential mechanism 47 located below the motor and carried by framework 48.

Arranged to the rear of scales 33 is a multi-color inked ribbon 49 (Figure 2) carried by a pair of spaced parallel spools 51 which are driven from motor 45 through gearing 46 in one direction or another relative to the strip chart by means of a horizontal cross-shaft 52 as explained in U. S. Patent No. 2,551,866.

Arranged at the top and front of the instrument, as shown in Figure 2, is a timing chart drive roller 56 which is also driven from gearing 46. To the rear of the roller is a tear-off bar or strip 57, re-roll spring clips or guides 58 and a pair of re-rollers 59 whose speed is designed to be higher than that of drive roller 56 to tightly wind the used portion of the strip chart.

A vibrator motor 61 is mounted on framework 48, as shown in Figure 2, and drives a mass 60 whereby mechanical friction imposed upon the indicating indices or marker pins is overcome. Also supported by the framework are conventional capacitors 62 for motors 45 and 61, the capacitors being arranged on each side of the vibrator motor. Chassis 63 of Figure 3 defines a support for the electrical zeroing means and above the chassis 63 in the rear of the instrument is a torque tube 65 for the ribbon mechanism while behind the scales 33 and marking pins 66, as shown in Figure 2, are the ribbon 49 and paper chart 35.

As better shown in Figure 2, a platen 67 is normally biased toward the chart by means of springs 68 and urged away from the chart by means of levers 69 depending from a cross-shaft 71 one end of which is provided with a lever, as explained in U. S. Patent No. 2,551,866, which is operated once a second by way of a timing cam.

The present invention is directed to features of a novel speed regulator system for the motor 45 and for purposes of clarity and for a better understanding thereof, the various features of the novel regulator system will be considered separately hereinafter.

*Constant speed regulator*

Inasmuch as the driving motor 45 is subject to speed variation with fluctuations in the power supply and since it is desirable to maintain the operating portions of the instrument at a substantially constant speed, the motor is connected by gearing 46 with a spur gear 80 (Figures 4 and 5) which is attached to a shaft 81, the latter bearing a brake disc 82 which rotates between a fixed washer 83 and a floating washer 84. Washer 84, moreover, is urged toward disc 82 by a spring 86 which is governed by a brake lever 87 pivoted at one end on a fixed pin 88, the other end of the brake lever being governed by the accumulated or integrated difference of the speed of shaft 81 from the desired constant speed.

Also actuated by gearing 46, but at a lower speed than brake disc 82, is an idler pinion 89 which is connected with a gear 91 which is secured to a shaft 92 (Figure 6). A gear 93 is connected with a constant speed escapement mechanism and has its hub 94 threaded internally for cooperation with the threads 95 provided on shaft 92 so that any difference in the relative speed of gears 91 and 93 is reflected by an axial movement of gear 93 relative to shaft 92. Gear hub 94 is provided with a circumferential groove 96 which supports one end of brake lever 87 to provide brake actuation to slow motor 45 until it runs at the desired speed. A torsional spring 97 connects gears 91 and 93 to permit rotation of gear 93 relative to gear 91, gear 93 being driven by the spring.

As more clearly shown in Figures 7 and 8, gear 93 drives a pinion 98 to which is affixed an escapement ratchet wheel 99. Two escapement pins 101 are oscillatably driven by the ratchet wheel and are mounted on a rock lever 102 which has a notch 103 that cooperates with an eccentric pin 104 on a balance wheel 105 which is timed by a spring 106. Balance wheel 105 and spring 106 are connected with a shaft 107 which is provided with a notch 108 that cooperates with another lever 109 that moves angularly with lever 102 to lock the rock lever 102 and escapement wheel 99 except at intervals timed by the balance wheel and spring 106, levers 102 and 109 being secured together and to their common shaft 111.

When motor driven shaft 92 rotates too rapidly, its thread 95 forces gear hub 94 away from gear 91 to move brake lever 87 in a direction to exert pressure on spring 86 and on high speed brake disc 82 so that motor 45 is gradually slowed down to the speed that corresponds with that of escapement controlled gear 93. By this provision a novel and efficient lightweight drive has been provided which is substantially independent of frequency and voltage variations of the power supply.

Although but one embodiment of the present invention has been illustrated and described in detail, it is to be expressly understood that the invention is not limited thereto. Various changes in the design and arrangement of the parts can be made without departing from the spirit and scope of the invention and the same will now be understood by those skilled in the art.

We claim:

In a recording aircraft instrument of the character described including a driven chart and print means for effecting substantially continuous impressions on the chart indicative of certain variants affecting flight conditions during a specific period of flight, and further including a motor and a regulator system for the motor for driving the chart at a constant speed so as to move definite lengths of the chart beneath the print means, the regulator system comprising a main driven shaft carrying a brake drum, spring pressed friction means engaging the drum for controlling the speed of the shaft, a pivoted braking lever actuable to vary the pressure of the friction means with the drum, gearing operatively engaging the shaft with the motor, a second driven shaft, a spur gear carried by the second shaft, other gearing operatively engaging the second shaft with the motor for rotation of the second shaft at a speed relatively slower than that of the main shaft, constant speed control escapement mechanism, an escapement drive gear geared to drive the escapement mechanism and threadedly carried upon the second shaft, a torsion spring about the second shaft and operatively engaging the escapement drive gear with the spur gear, and a hub unitary with the escapement drive gear and having an annular channel in which is tangently received a free end of the braking lever, whereby excessive rotation of the second shaft beyond that of the constant speed of the escapement mechanism is reflected by a winding of the torsion spring and consequent traveling of the escapement drive gear and its hub to vary the braking pressure of the spring pressed means upon the brake drum.

(References on following page)

References Cited in the file of this patent

UNITED STATES PATENTS

| | | | |
|---|---|---|---|
| 270,684 | Malcolmson | Jan. 16, | 1883 |
| 795,705 | Kimball | July 25, | 1905 |
| 876,256 | Benton | Jan. 7, | 1908 |
| 1,484,185 | Metcalfe | Feb. 19, | 1924 |
| 1,832,822 | Thompson | Nov. 17, | 1931 |
| 1,840,482 | Wottring | Jan. 12, | 1932 |
| 1,912,716 | Lane | June 6, | 1933 |
| 2,119,550 | Loughridge | June 7, | 1938 |
| 2,238,218 | Ferris | Apr. 15, | 1941 |
| 2,323,791 | Carrington | July 6, | 1943 |

FOREIGN PATENTS

| | | | |
|---|---|---|---|
| 911 | Great Britain | Mar. 2, | 1880 |